E. R. CAHOONE.
HEATING STOVE.
APPLICATION FILED JAN. 25, 1908.
928,737.
Patented July 20, 1909.
2 SHEETS—SHEET 1.
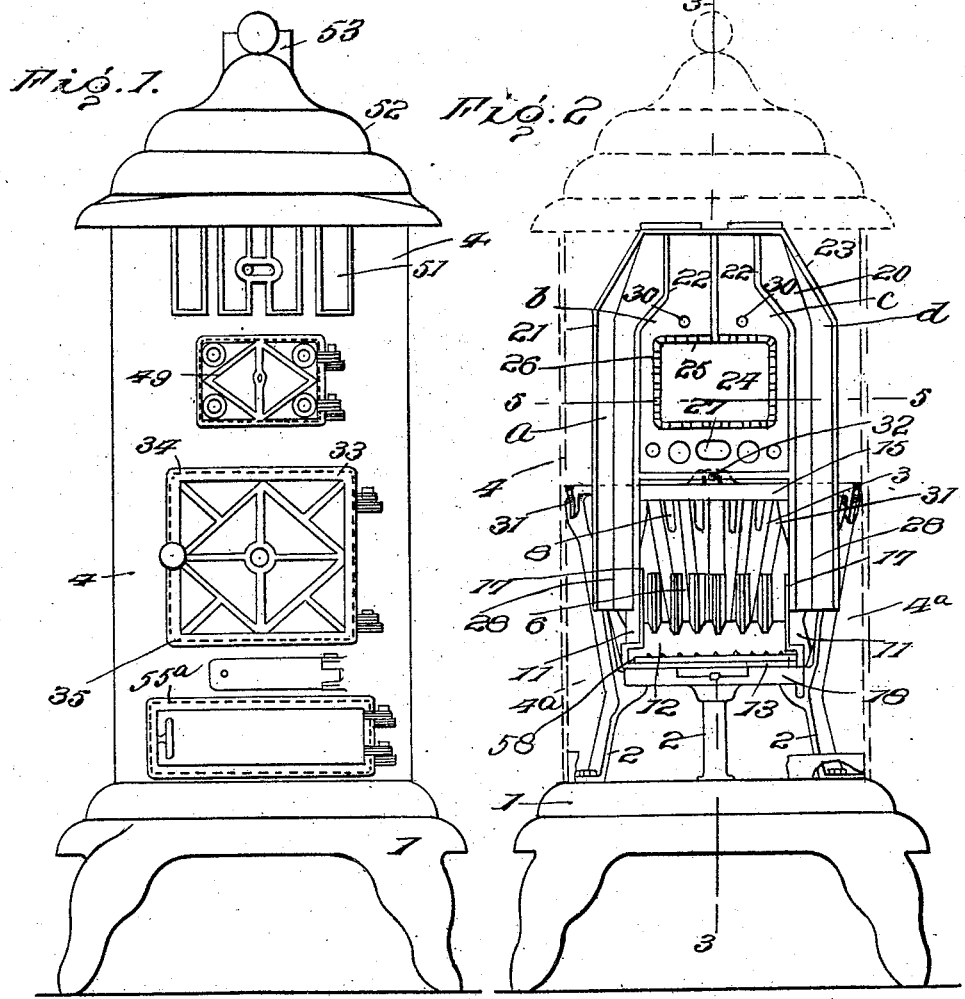
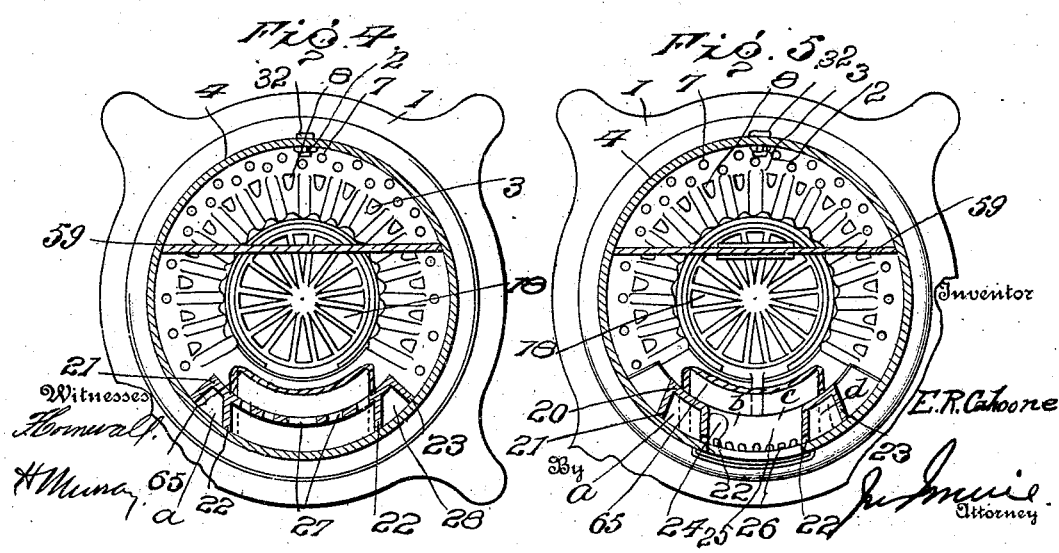

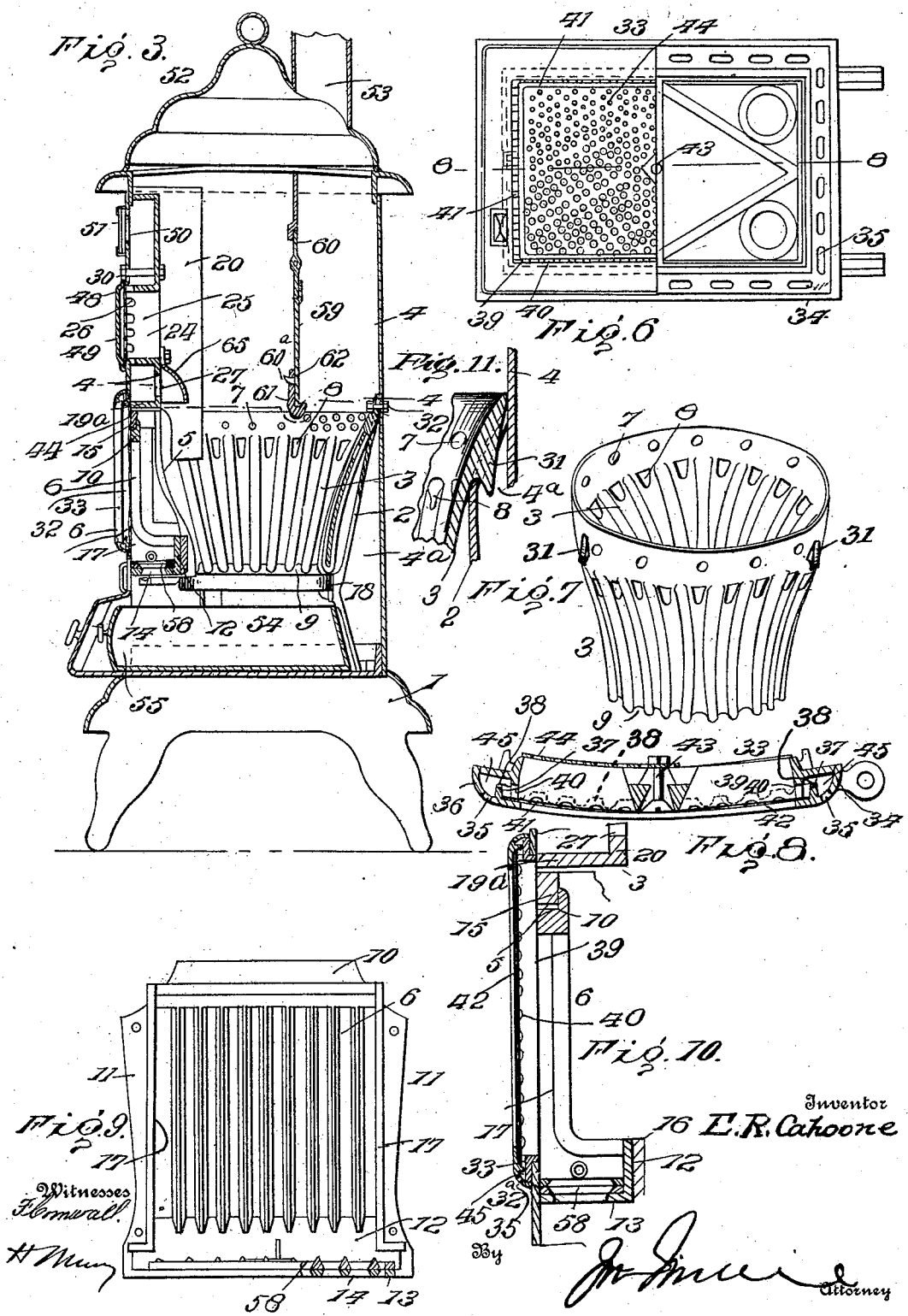

UNITED STATES PATENT OFFICE.

EDWIN R. CAHOONE, OF BEACHMONT, MASSACHUSETTS.

HEATING-STOVE.

No. 928,737.  Specification of Letters Patent.  Patented July 20, 1909.

Application filed January 25, 1908. Serial No. 412,652.

*To all whom it may concern:*

Be it known that I, EDWIN R. CAHOONE, a citizen of the United States, residing at Beachmont, in the county of Suffolk and State of Massachusetts, have invented certain new and useful Improvements in Heating-Stoves, of which the following is a specification.

This invention relates to improvements in heating stoves, its prime object being to provide an economical construction to utilize the fuel to obtain the best results from the generation of heat.

A further object of the invention is to provide a structure where the fuel may be exposed to give an open grate effect.

The invention also comprehends structural arrangement of parts to distribute air to the fuel to augment the combustion.

Other objects and advantages will be hereinafter referred to and particularly pointed out in the claims.

In the drawings—Figure 1 is a front elevation of my improved stove. Fig. 2 is a similar view, the casing being shown in dotted lines. Fig. 3 is a vertical section on the line 3—3, Fig. 2. Fig. 4 is a horizontal section on the line 4—4, Fig. 3. Fig. 5 is a similar view on the line 5—5, Fig. 2. Fig. 6 is a detail view of a door or air inlet structure used in connection with my improved stove. Fig. 7 is a detail view of a slightly different form of fire pot structure. Fig. 8 is a horizontal section on the line 8—8, Fig. 6. Fig. 9 is a detail front elevation of the front grate. Fig. 10 is an enlarged detail view of the connection between the front grate and the fire pot. Fig. 11 is an enlarged detail view of the connection between the fire pot and one of the standards.

The numeral 1, indicates a base of appropriate form, supporting brackets 2, on which is mounted the fire pot 3. The base also supports a casing 4, and the fire pot is spaced therefrom to form an air heating chamber $4^a$. The fire pot is preferably cut away at its front to form an opening 5, opposite which is mounted a front grate 6. The fire pot is corrugated to form a series of projections and grooves for the passage of air around the fuel and near the top of the grooves are two series of openings 7 and 8, and at the lower end are slots 9. The front grate 6, is of angular formation, and is provided at the top with a stepped flange 10; at the sides with flanges 11, and at the bottom with a flange 12, and an outwardly projecting shelf 13, the latter having openings 14. The top flange 10, is fitted behind the connecting bar 15, of the fire pot, while the flanges 11, are riveted or otherwise secured to the body of the fire pot, and the lower flange 12, abuts against the lower connecting bar 16, of said fire pot. Extending outwardly from the front grate are flanges 17—17, which divide the air heating chamber surrounding the fire pot. When the front grate is secured to the fire pot as described the fuel is confined thereby, and is supported by a bottom grate 18, of appropriate construction.

20, indicates what I shall term a screen, having outwardly projecting flanges 21, 22 and 23; a fuel opening 24, surrounded by a flange 25, formed on its edges with notches 26. Below the fuel opening 24, are air exit openings 27. The sides of the screen and the flanges 21 and 22, extend somewhat below the body portion, to form legs 28, which lie close to the flanges 17—17, of the front grate. The screen is placed in position against the inner side of the casing 4, the flanges 21, 22, 23, abutting against the casing thereby forming a series of ducts $a$, $b$, $c$, and $d$, the flange $19^a$, resting on the connecting bar 15, of the fire pot, after which bolts 30, are passed through the screen and the casing. The screen therefore holds the front portion of the fire pot from upward movement.

Two of the standards 2, are slotted at their upper ends to engage lugs 31, on the fire pot, while the third standard 2, is extended and slotted, to receive a bolt 32, passing through the casing 4, and on the inner side of which is placed a nut. This means coupled with the screen, effectually holds the fire pot in proper position.

The casing 4, is formed with an opening $32^a$, opposite the front grate, and over this opening operates a door 33. The door is of particular construction, and forms an important part of the means for introducing air to the front of the fuel. 34, indicates an outer door frame, formed with air inlet openings 35, and two inwardly projecting flanges 36, and two inwardly projecting flanges 37. The flange 37, is notched on its inner edge, as at 38, to provide for the passage of air. An inner frame 39, is carried by the outer frame, and it has a flange 40, notched at 41. A sheet of mica 42, is placed inside the outer frame, and the flange 40, confines it in its place. The inner frame is placed inside the outer frame, and a bolt 43, passing through openings in both frames secures them together. I may provide a perforated piece of sheet metal 44, for the supplemental frame, to divide and intermingle the air currents passing to the fuel.

When the door is assembled the air passes from the atmosphere through the openings 35, into the chamber 45, formed by the two frames and thence through the notches of the flanges 37, and then deflected by the flange 39, through the notches 41, which are located intermediate the notches 38, to the chamber formed between the mica and the thin metal perforated plate. The various streams of air become divided and therefore are more susceptible of being heated, and in this latter condition pass through the perforations in plate 44, to the fuel. The casing 4, is also formed with an opening 48, opposite the fuel opening 24; in the screen and fitting over said opening is a door 49. Above the feed door 49, are openings 50, over which fit dampers 51, to regulate the supply of air to the ducts $a$, $b$, $c$ and $d$, and the upper end of the casing is provided with an ornamental top 52, through which passes the flue 53.

Below the bottom grate is the ash pit 54, having an ash pan 55, and a door provided with suitable draft inlet openings $55^a$.

In order to admit draft under the front grate 6, or to remove the soot and ashes accumulating on the shelf 13, I provide a slide damper 58, which coöperates with the openings 14.

A partition 59, depends within the casing toward the fire pot, and in it is a damper 60. At the lower end of the partition are hooks $60^a$, and a bib 61, having openings 62, to engage the hooks, which serves as a means for detaching the burned-out portion, and substituting another. The purpose of this partition is to cause the products of combustion to pass directly to and through the flue, or to prolong the passage of the products of combustion in the casing, and thereby obtain more heat. That is to say, by opening the damper the gases will rise on both sides the partition, and obviously heat a greater surface of the casing. If, however, the damper be closed the products of combustion will pass behind the partition, and as the upper front part of the casing will not be subjected to the internal heat, the effectiveness of the stove will not be as great.

I may use a fire pot, such as shown in Fig. 7, wherein the cut-away portion is dispensed with. In this case, however, the front grate is not used, and in order to obtain the effect of an open grate fire, the openings 8 and 9 are depended upon.

In operation the fire is started in the usual manner. Air is admitted through the openings 50, which follows the ducts $a$, $b$, $c$ and $d$, to the air heating chamber $4^a$, and the openings 27. The air in passing through the ducts becomes heated, and then when it contacts with the outer surface of the fire pot in the air heating chamber it is heated to a very much higher temperature. From the air heating chamber the heated air passes through the openings 8, and 9, to the upper portion of the fire pot, in a multiplicity of streams. Air is also introduced through the openings around the door 33, to the body of the fuel, and also upwardly through the openings or notches in the fire pot and from the ash pit and the air heating chamber. The various air currents attacking the fuel liberate the gases, which are further mixed with the heated streams of air from the openings 8 and 9, the latter being so arranged as to be uniformly introduced to the fire pot. Air is also introduced downwardly to the fire through the ducts $b$, and $c$, part passing through the notches 26, and part passing through the openings 27, and being deflected downwardly toward the fuel by a deflector 65.

By arranging the front grate in front of the fire pot, the stove when burning gives the effect of an open fire place, and at the same time additional space is provided for the fuel.

What I claim is:

1. In a stove, the combination with a casing, a fire pot within and spaced from said casing to form an air heating chamber, a screen on the inside of the casing resting on a member of said fire pot and preventing upward movement of the latter, said screen having flanges bearing against the casing to form ducts to introduce air to the air heating chamber and also to introduce air downwardly to the fuel above the level of the air heating chamber, and a flue located to draw the air from the ducts and the air heating chamber to the fire pot.

2. In a stove, the combination with a casing formed with a fuel opening, a fire pot within and spaced from the casing to form an air heating chamber, a grate adjacent the fire pot and within the air heating chamber, flanges dividing the grate from the air heating chamber, a screen located in the casing and having flanges abutting against the latter to provide air ducts, said screens having an opening registering with the fuel opening in the casing and also formed with other exit openings below the plane of the fuel opening, a shield to deflect the air passing through the openings below the fuel opening downwardly in the fire pot, and a flue located to draw the air to the fire pot.

3. In a stove, the combination with a casing formed with a fuel opening and with a lower opening, a door covering the latter opening, a fire pot within and spaced from the casing to form an air heating chamber, a screen formed with an opening under the fuel opening and also formed with a depression which with the casing forms an air duct, said screen located on the inside of the casing resting on a member of the fire pot and preventing upward movement of the latter, said fire pot being adjacent the lower opening in the casing, air being introduced to the air heating chamber through the aforesaid duct which communicates with the atmosphere, a shield to deflect the air passing through the opening below the fuel opening downwardly in the fire pot, an exit flue located above the fire pot to draw the air from the air heating chamber and the duct above the fire pot to the fire pot.

4. In a stove, the combination with a casing, a fire pot within and spaced from the casing to provide an air heating chamber, a grate adjacent the fire pot and communicating therewith, flanges adjacent the grate to divide the same from the air heating chamber, an air duct each side the grate to direct air to the air heating chamber, air ducts to direct air above the fire pot, a feed opening formed intermediate the ducts, and means for introducing air to the fuel adjacent the grate and independent of the air supplied by the ducts.

5. In a stove, the combination with a casing formed with an opening, a fire pot within the casing, said fire pot having air inlet openings, air introducing means fitting over the opening in the casing, said air introducing means comprising an outer frame formed with inlet openings and having a flange formed with notches and an inner frame spaced from the outer frame to form a chamber, said inner frame having a notched flange extending toward the outer frame, the notches in the two flanges being out of alinement, means independent of the air introducing means for directing air to a different point in the fire pot, and a flue to draw the air to the fire pot from the air introducing means.

6. In a stove, the combination with a casing, a fire pot within and spaced from the casing to provide an air heating chamber, a grate connected to and communicating with the fire pot, flanges extending across the air heating chamber to separate the grate therefrom, a screen on the inside of the casing, said screen having flanges to form air ducts, two of which extend on the sides of the flanges to direct air to the air heating chamber, the other flanges extending from the screen to provide ducts to direct air above the fire pot, a shield to direct the air delivered above the fire pot downwardly, and a feed door located above the shield.

7. In a stove, the combination with a casing, a fire pot within and spaced from the casing to provide an air heating chamber, a grate connected to and communicating with the fire pot, flanges extending across the air heating chamber to separate the grate therefrom, a screen on the inside of the casing, said screen having flanges to form air ducts, two of which extend on the sides of the flanges to direct air to the air heating chamber, the other flanges extending from the screen to provide ducts to direct air above the fire pot, a shield to direct the air delivered above the fire pot downwardly, one of said flanges of the screen bearing on the fire pot to prevent the upward movement of the latter, a feed door located above the shield, and means for securing the fire pot to the casing.

8. In a stove, the combination with a casing, an ash pit, a fire pot within and spaced from the casing to provide an air heating chamber, said fire pot having an opening, a grate adjacent the opening and extending beyond the same, flanges separating the grate from the air heating chamber, a damper arranged below the grate and above the ash pit, and means for introducing air to the air heating chamber and means for introducing air to the fuel adjacent the grate and independent of the air supplied to the heating chamber.

9. In a stove, the combination with a casing, an ash pit, a fire pot within and spaced from the casing to provide an air heating chamber, said fire pot having an opening, a grate adjacent the opening and extending beyond the same, flanges separating the grate from the air heating chamber, ducts for introducing air to the air heating chamber, means for introducing air to the fuel adjacent the grate and independent of the air supplied to the heating chamber, a partition depending within the casing, a damper and a flue in the casing above the damper.

10. In a stove, the combination with an ash pit, a fire pot within and spaced from the casing to provide an air heating chamber, said fire pot having an opening, a grate adjacent the opening and extending beyond the same, flanges separating the grate from the air heating chamber, ducts for introducing air to the air heating chamber, a partition depending within the casing, a detachable tip on the partition, hooks and openings with which the hooks engage between the partition and the tip, a damper in the partition, and a flue in the casing above the damper.

11. In a stove, the combination with a casing, a fire pot provided with openings and located in said casing and spaced therefrom to form an air heating chamber, a grate extending from the fire pot and supported by the latter, a damper below the grate section, ducts for introducing air to the air heating chamber, means above the fire pot, for introducing air downwardly adjacent the grate independent of the air supply to the heating chamber and a damper for regulating the independent supply of air to the heating chamber.

In testimony whereof I affix my signature in presence of two witnesses.

EDWIN R. CAHOONE.

Witnesses:
W. N. WOODSON,
JNO. IMIRIE.